UNITED STATES PATENT OFFICE.

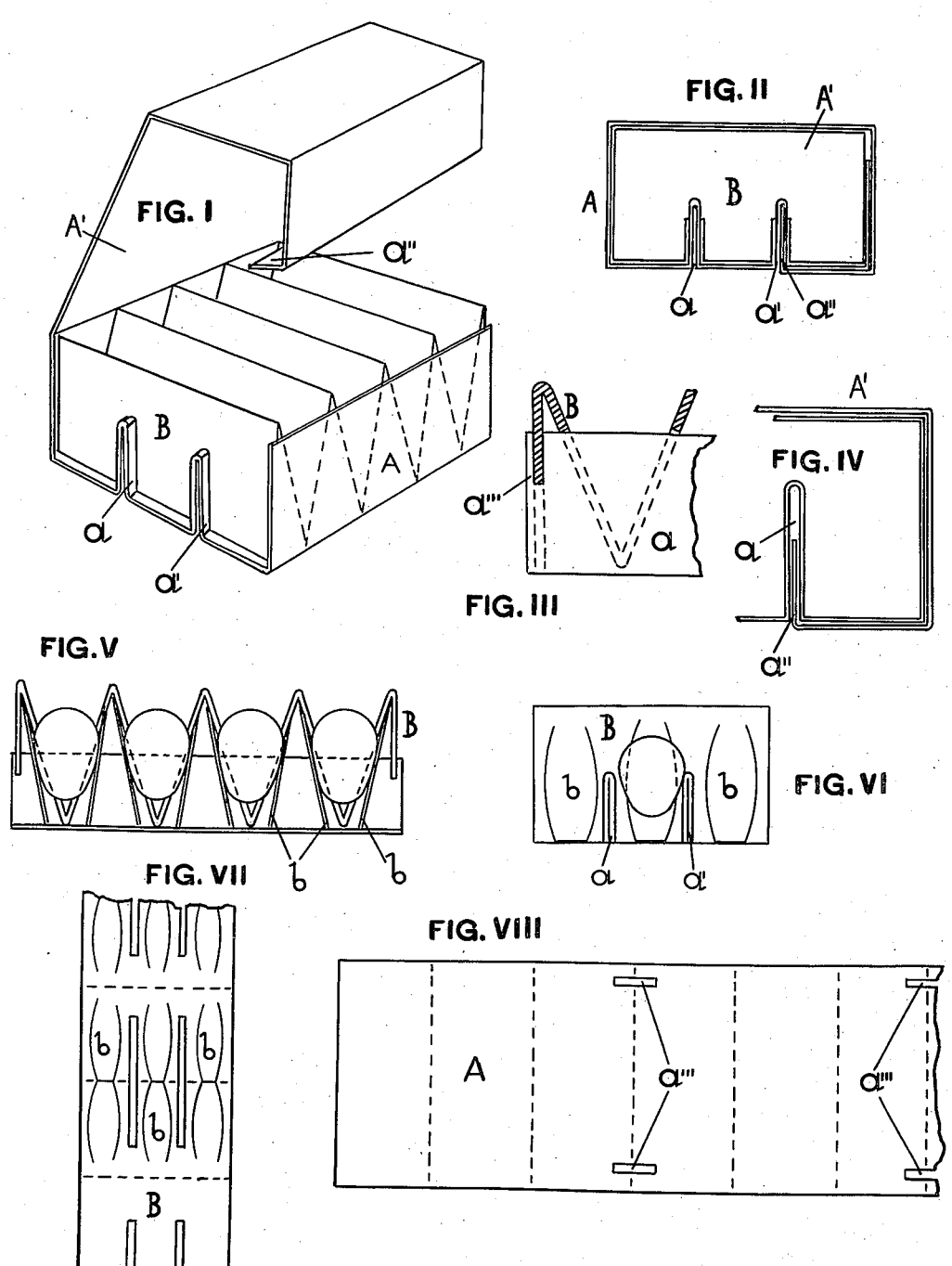

EDWARD E. HALE, OF GUELPH, ONTARIO, CANADA.

FOLDING CARDBOARD EGG BOX OR CARRIER.

1,252,002.    Specification of Letters Patent.    Patented Jan. 1, 1918.

Application filed June 21, 1917.   Serial No. 176,149.

*To all whom it may concern:*

Be it known that I, EDWARD E. HALE, a subject of His Majesty King George the Fifth by the Grace of God, of the United Kingdom of Great Britain and Ireland and of the British Dominions beyond the Seas King, Defender of the Faith, Emperor of India, residing at the city of Guelph, in the county of Wellington, Province of Ontario, Dominion of Canada, have invented a new or Improved Folding Cardboard Egg Box or Carrier, of which the following is a specification.

My invention relates to folding cardboard boxes for the wholesale and retail delivery of eggs, and the object is to provide a cheap collapsible egg container that shall be strong and easily set up and that shall afford the maximum of protection to the eggs contained therein.

I attain these objects by the formed cardboard pieces creased, cut and set up as illustrated in the accompanying drawings, in which—

Figure I is a perspective view of my new or improved egg carrier or container with the lid unlocked and raised, Fig. II is an end view of the egg carrier with the lid closed and locked, Fig. III is a detail showing in sectional elevation the end of the V shaped filling, the last section held in vertical position by a slot in the infolded partition, Fig. IV is an enlarged view of part of Fig. II showing the lid folded over and under the box and its locking flap in position, Fig. V is a longitudinal sectional elevation of the body of my egg box with the eggs in position therein, Fig. VI is a cross-section showing one of the folds of the V shaped filling, Fig. VII is a plan or flattened view of one end of the cardboard forming the filling of the egg carrier, Fig. VIII is a smaller view of the cardboard forming the casing and lid of the egg carrier.

Smaller letters of reference indicate smaller parts in all the drawings.

"A" is the cardboard forming the outer casing of the box or egg carrier. It is creased and folded into two upwardly projecting infolds, $a$ and $a'$, Fig. I. The infolds, $a$ and $a'$, while supporting the filling, form partitions between each row of eggs and materially stiffen and strengthen the box. The casing "A" is further continued into the lid, $A'$ creased so as to cover and encircle the box and terminating in the locking flap $a''$.

"B" is the V shaped or corrugated filling, the end of which as shown in Fig. III, is held in a vertical position in the slot $a'''$. Into each of the folds of this V shaped filling are cut downwardly projecting tongues, $b$, as shown in Fig. VI and Fig. VII. It is provided with slots between each pair of tongues for the reception of the infolds, $a$ and $a'$, while shorter slots, $a'''$ Fig. VIII, are provided in the casing "A" for the reception of the single end member of the filling "B".

It will thus be seen that each box is composed of two sheets of stamped and creased cardboard as shown in Fig. VII and Fig. VIII. The casing "A" is folded into position as shown in Fig. I and the V shaped filling "B" then inserted into position, the end walls being secured in the vertical slot $a'''$ as shown in Fig. III.

To close and lock the box, the lid is closed down and the free end of the casing, terminating in the locking flap $a''$, is folded over the side of the box, the locking flap $a'''$ being tucked into the recess formed by the first infold $a'$. The opposite downwardly projecting spring tongues, $b$, Fig. VI, are forced outward by the pressure of the inserted egg as shown in Fig. V and assume an almost vertical position, greatly strengthening the box and holding the egg under a light tension.

It will readily be seen that the egg carrier as hereinbefore described of two main pieces of cardboard, properly formed and creased, will form a strong, light and serviceable container.

I claim:

1. In an egg carrier or container formed of cardboard or other such like material provided with V shaped egg carrying troughs, downwardly projecting tongues cut or stamped in the sides of the V shaped troughs extending completely to the bottom of the same, said tongues being adapted to be pressed outward by the contained eggs thus raising the said V shaped troughs and the eggs contained therein from and out of contact with the bottom of the box for the purpose of holding the eggs out of contact with any part of the outer casing of the box or carrier substantially, as hereinbefore described and illustrated in the drawings.

2. The method of securing the ends of the V shaped egg troughs in a vertical position consisting in vertical slots at the ends of the upwardly projecting infolds into which the end fold of the V shaped filling sits, the lower portion of said end fold being provided with a corresponding vertical slot so as to allow said end fold to project to the bottom of the box for the purpose of providing a self-adjusting egg carrier filling which shall be rigidly secured at the ends so as to form part of the egg box or container substantially, as hereinbefore described and illustrated in the drawings.

3. In combination with the creased and folded cardboard casing of my egg carrier, the locking flap consisting of an extension of the lid of the box folded under and tucked into the first upwardly projecting infolded partition, as hereinbefore described and illustrated in the drawings.

EDWARD E. HALE.

Witnesses:
AGNES LAMBERT,
MILDRED THOMSON.